Patented June 3, 1947

UNITED STATES PATENT OFFICE 2,421,401

PROCESS FOR THE MANUFACTURE OF COMPOUNDS OF $\alpha,\beta$-(p,p'-DIHYDROXY-DIARYL)-$\alpha,\beta$-DIALKYL-ALKYL AND -ALKYLENE Erich Adler, Gert J. Gie and Hans von Euler, Stockholm, Sweden, assignors to Hoffmann-La Roche Inc., Nutley, N. J., a corporation of New Jersey No Drawing. Application September 7, 1944, Serial No. 553,110. In Sweden October 26, 1943

17 Claims. (Cl. 260—619)

In the hitherto known methods for the preparation of compounds of $\alpha,\beta$-(p,p'-dihydroxydiaryl)-$\alpha,\beta$-dialkyl-ethylene starting or intermediate products were employed in which the phenolic hydroxyl groups were closed by means of alkyl or acyl groups. It has now been found that the compounds in question can be obtained in very good yield without protecting the phenolic hydroxyl groups of the starting or intermediate materials. The process, compared with the known methods, is thus simplified, since the introduction and the reseparation of such protective groups can be omitted and since the various stages of the reaction proceed under milder conditions with better yields.

The present invention concerns the manufacture of compounds of $\alpha,\beta$-(p,p'-dihydroxy-diaryl)-$\alpha,\beta$-dialkyl-ethylene and of $\alpha,\beta$-(p,p'-dihydroxy-diaryl)-$\alpha,\beta$-dialkyl-ethane.

As starting materials, p-hydroxy-aryl-alkyl-ketones (Formula I, R=alkyl) are used which are easily obtainable in accordance with the usual methods. It is known that such ketones can be reduced to the corresponding pinacols by means of aluminum-amalgam in organic solvents. However, the yields in the case of these reductions are not satisfactory. It has now been established that the transformation of the said ketones into the pinacols (Formula II) takes place quantitatively if the reduction is carried out in alkaline, aqueous solution by means of sodium-amalgam.

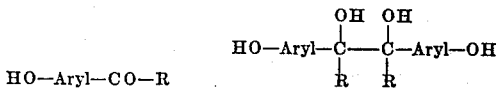

It has been further found that with pinacols of type II the pinacolin-rearrangement proceeds under particularly mild conditions. This rearrangement, for instance, takes place quickly and quantitatively at room temperature already if hydrogen chloride or bromide is caused to act on the pinacol. If the resulting pinacolin (Formula III) is thereupon subjected to a reduction with sodium and alcohol, the corresponding pinacolin alcohol (Formula IV) is obtained in practically quantitative yield.

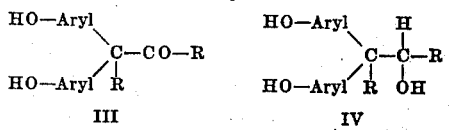

As is known, pinacolin alcohols, under the action of dehydrating materials, results in the so-called "retropinacolin-rearrangement." In accordance with the present invention, this rearrangement proceeds with surprising ease in the case of pinacolin alcohols with p-hydroxy-aryl groups (cf. Formula IV). It already sets in at room-temperature with great promptness. Among others, mineral acids, e. g. halogen hydracids, have proved to be suitable dehydrating agents. If, for instance, gaseous hydrogen chloride or hydrogen bromide is passed into a solution of pinacolin alcohol, the desired ethylene compound (Formula V) is formed in a very good yield. However, if hydrogen iodide is employed as dehydrating agent, a hydrogenation of the primarily resulting ethylene compound (Formula V) takes place in one single operation to yield the corresponding ethane compound (Formula VI). For the purpose of carrying out the reaction last referred to, it is advisable to work at elevated temperature and to add red phosphorus in addition to hydrogen iodide.

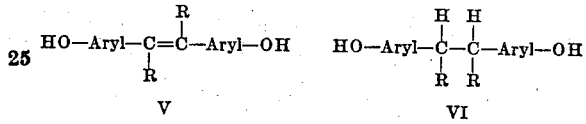

Naturally, the ethane compound (VI) can also be obtained if in accordance with the above directions the ethylene compound is first isolated and the same then reduced to the ethane compound by means of hydrogen iodide and red phosphorus.

The present invention enables the preparation of the said ethylene and ethane compounds by means of reactions which can easily be carried out, giving particularly good yields. In view of their high oestrogenic activity, these compounds are to be used in therapy.

Example 1

50 parts by weight of p-hydroxy-propiophenone are dissolved in 200 parts by weight of a 12.5 per cent. solution of caustic soda and shaken with 350 parts by weight of 3 per cent. sodium amalgam. The sodium salt of the pinacol thereby precipitating is reacted with glacial acetic acid, whereby the free pinacol is obtained (melting point 205–210° C., after purification 215–217° C.). The yield amounts to 95 per cent. of the theoretical. The pinacol is suspended in ether and gaseous hydrogen chloride introduced, whereby water separates and the pinacolin formed is dissolved in the ether, from which it is obtained by evaporation as a viscous oil (diacetate of melting point 91° C.). The yield is quantitative.

40 parts by weight of pinacolin are dissolved in ethyl alcohol and gradually treated with 80 parts by weight of sodium under reflux. The solution is decomposed with water and the pinacolin alcohol formed extracted from the neutralised solution with ether. The pinacolin alcohol is a viscous oil which is characterised by a dibenzoate of melting point 172° C. The yield is 95 per cent. of the theoretical.

A solution of 30 parts by weight of pinacolin alcohol in ether is saturated with hydrogen chloride at room temperature and the ether solution then agitated with bicarbonate. After concentration by evaporation it leaves behind the crude diethylstilboestrol [α,β - (p,p' - dihydroxy - diphenyl) -α,β-diethyl-ethylene] which, when recrystallised from benzene, melts at 170–171° C. The yield amounts to 75 per cent. of the calculated. The total yield of diethyl-stilboestrol, calculated on p-hydroxy-propiophenone, is 68 per cent. of the theoretical.

*Example 2*

30 parts by weight of pinacolin alcohol, prepared in accordance with Example 1, are dissolved in 25 parts by weight of glacial acetic acid and heated for 30 minutes to 135–140° C. after having added 20 parts by weight of hydriodic acid (specific gravity=1.94) and 5 parts by weight of red phosphorus. The whole is filtered, the solution poured into water, extracted with ether and the ether solution washed with bicarbonate. The oil remaining after distilling off the ether is taken up in chloroform, whereby hexoestrol [α,β- (p,p-dihydroxy-diphenyl) -α,β - diethyl - ethane] crystallises out. Melting point after recrystallisation from benzene: 185° C. Yield 20 per cent.

*Example 3*

Diethyl-stilboestrol, prepared in accordance with the directions given in Example 1, is reduced in glacial acetic acid by means of hydrogen iodide and red phosphorus in accordance with Example 2. Hexoestrol (melting point 185° C.) is obtained in a yield of 22 per cent.

We claim:

1. A process for the manufacture of compounds with oestrogenic activity selected from the group consisting of alpha,beta-(p,p'-dihydroxy-diphenyl) -alpha,beta-dialkyl-ethanes and alpha,beta- (p,p'-dihydroxy-diphenyl) - alpha,beta - dialkyl-ethylenes, which comprises reducing a p-hydroxy-phenyl-alkyl-ketone by means of sodium amalgam in an alkaline aqueous solution to the corresponding pinacol, dehydrating the pinacol to the corresponding pinacolin, and reducing the said pinacolin to the corresponding pinacolin alcohol.

2. A process for the manufacture of compounds with oestrogenic activity selected from the group consisting of alpha,beta-(p,p'-dihydroxy-diphenyl) -alpha,beta-dialkyl-ethanes and alpha,beta- (p,p'-dihydroxy-diphenyl) - alpha,beta - dialkyl-ethylenes, which comprises reducing a p-hydroxy-phenyl-alkyl-ketone by means of sodium amalgam in an alkaline aqueous solution to the corresponding pinacol, dehydrating the pinacol to the corresponding pinacolin, reducing the said pinacolin to the corresponding pinacolin alcohol and treating the pinacolin alcohol with a halogen hydracid.

3. A process for the manufacture of oestrogenic alpha,beta-(p,p'-dihydroxy - diphenyl) - alpha,-beta-dialkyl-ethylenes, which comprises reducing a p-hydroxy-phenyl-alkyl-ketone by means of sodium amalgam in an alkaline aqueous solution to the corresponding pinacol, dehydrating the pinacol to the corresponding pinacolin, reducing the said pinacolin to the corresponding pinacolin alcohol, and treating the pinacolin alcohol with hydrogen chloride to product an alpha,beta-(p,p'-dihydroxy-diphenyl) -alpha,beta-dialkyl - ethylene.

4. A process for the manufacture of oestrogenic alpha,beta-(p,p'-dihydroxy - diphenyl) - alpha,-beta-dialkyl-ethylenes, which comprises reducing a p-hydroxy phenyl-alkyl-ketone by means of sodium amalgam in an alkaline aqueous solution to the corresponding pinacol, dehydrating the pinacol to the corresponding pinacolin alcohol, reducing the said pinacolin to the corresponding pinacolin alcohol, and treating the pinacolin alcohol with hydrogen bromide to produce an alpha,-beta-(p,p'-dihydroxy - diphenyl) -alpha,beta-dialkyl-ethylene.

5. The process for the manufacture of oestrogenic alpha,beta-(p,p' - dihydroxy - diphenyl) -alpha,beta-dialkyl-ethanes, which comprises reducing a p-hydroxy-phenyl-alkyl-ketone by means of sodium amalgam in an alkaline aqueous solution to the corresponding pinacol, dehydrating the pinacol to the corresponding pinacolin, reducing the said pinacolin to the corresponding pinacolin alcohol, and treating the pinacolin alcohol with hydrogen iodide to produce an alpha,-beta-(p,p'-dihydroxy - diphenyl) -alpha,beta-dialkyl-ethane.

6. A process for the manufacture of oestrogenic alpha,beta - (p,p' - dihydroxy - diphenyl) -alpha,beta-dialkyl-ethanes, which comprises reducing a p-hydroxy-phenyl-alkyl-ketone by means of sodium amalgam in an alkaline aqueous solution to the corresponding pinacol, dehydrating the pinacol to the corresponding pinacolin, reducing the said pinacolin to the corresponding pinacolin alcohol, and treating the pinacolin alcohol with hydrogen iodide and red phosphorus to produce an alpha,beta - (p,p' - dihydroxy-diphenyl) -alpha,beta-dialkyl-ethane.

7. The process comprising reducing an alpha,beta-(p,p'-dihydroxy-diphenyl) -alpha,beta-dialkyl-ethylene with hydrogen iodide to produce an alpha,beta-(p,p'-dihydroxy-diphenyl) -alpha,beta-dialkyl-ethane.

8. The process comprising reducing an alpha,beta-(p,p'-dihydroxy-diphenyl) -alpha,beta-dialkyl-ethylene with hydrogen iodide and red phosphorus to produce an alpha,beta-(p,p'-dihydroxy-diphenyl) -alpha,beta-dialkyl-ethane.

9. A process for the manufacture of alpha,beta-(p,p'-dihydroxy-diphenyl) -alpha,beta-dialkyl-ethanes having oestrogenic activity, which comprises reducing a p-hydroxy-phenyl-alkyl-ketone by means of sodium amalgam in an alkaline aqueous solution to the corresponding pinacol, dehydrating the pinacol to the corresponding pinacolin, reducing the said pinacolin to the corresponding pinacolin alcohol, treating the pinacolin alcohol with a halogen hydracid, to produce an alpha,beta-(p,p'-dihydroxy-diphenyl) -alpha,beta-dialkyl-ethylene, and reducing said compound with hydrogen iodide and red phosphorus to produce the desired corresponding ethane.

10. The process of claim 1 wherein "alkyl" is ethyl throughout the claim.

11. The process of claim 2 wherein "alkyl" is ethyl throughout the claim.

12. The process of claim 8 wherein "alkyl" is ethyl throughout the claim.

13. The process of claim 9 wherein "alkyl" is ethyl throughout the claim.

14. A process for the manufacture of α,β-(p,p'-dihydroxy-diphenyl)-α,β-dialkyl-ethanes, which comprises dehydrating and hydrogenating a pinacoline alcohol of the following formula:

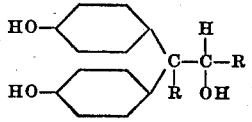

wherein R is alkyl, in one step with hydrogen iodide.

15. The process of claim 14 wherein "dialkyl-ethanes" is diethyl-ethane and R is ethyl.

16. A process for the manufacture of α,β-(p,p'-dihydroxy-diphenyl)-α,β-dialkyl-ethanes, which comprises dehydrating and hydrogenating a pinacoline alcohol of the following formula:

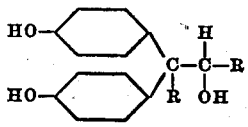

wherein R is alkyl with hydrogen iodide in the presence of red phosphorous.

17. The process of claim 16 wherein "dialkyl-ethanes" is diethyl-ethane and R is ethyl.

ERICH ADLER.
GERT J. GIE.
H. v. EULER.

REFERENCES CITED

The following references are of record in the file of this patent:

FOREIGN PATENTS

| Number | Country | Date |
|---|---|---|
| 537,993 | Great Britain | July 16, 1941 |

OTHER REFERENCES

Papa, "Jour. Organic Chem.," vol. 7, pp. 587–590 (1942).

Dodd "Proc. Royal Soc.," (London) (B), vol. 127, pp. 140–166.

Kerschbaum, "Natuwissenschaften," vol. 27, pp. 131–132 (1939).

Dochen, "Jour. Am. Chem. Soc.," vol. 62, pp. 2163–2164 (1940).

Bernstein, "Jour. Am. Chem. Soc.," vol. 62, pp. 2871–2873 (1940).